March 1, 1932.    A. E. GREENE    1,847,527
COMBUSTION ARC PROCESS
Filed July 8, 1926
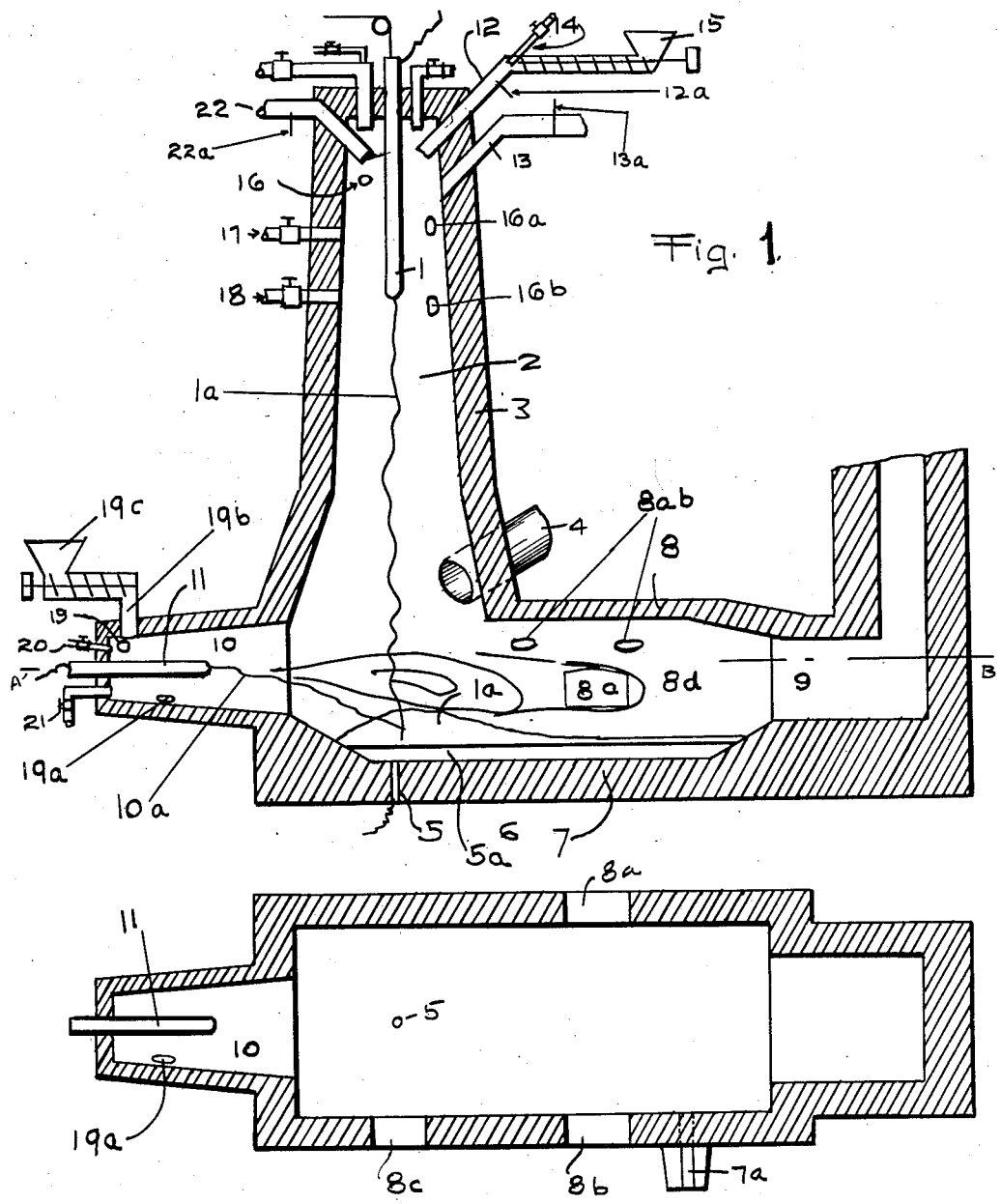
Fig. 1.
Fig. 2.
INVENTOR

UNITED STATES PATENT OFFICE

ALBERT E. GREENE, OF MEDINA, WASHINGTON

COMBUSTION-ARC PROCESS

Application filed July 8, 1926. Serial No. 121,137.

This invention relates to metallurgy and has for an object the provision of an improved method of reducing ores. More particularly, the invention contemplates the provision of an improved method of operating a metallurgical furnace provided with one or more arcing electrodes.

The present application is a continuation in part of my co-pending application Serial No. 254,224, filed September 18, 1918.

According to the method of the invention a mixture of air or other combustion supporting gas and carbonaceous material is passed into a furnace chamber along an electric arc to form a combined electric arc and combustion flame. The relative amounts of air or other combustion supporting gas and carbonaceous material employed are so proportioned that a reducing flame is produced. Ore to be reduced, such, for example, as iron oxide ore, is charged into the furnace chamber through the reducing flame. The ore in passing through the flame is reduced and the resulting metal is collected on the hearth of the furnace chamber.

According to the preferred practice, the carbonaceous material and combustion supporting gas are introduced into the combustion zone in such a manner that the resulting combustion flame completely surrounds the arc. The ore may be passed through the reducing flame in any suitable manner. The ore, carbonaceous material, and combustion supporting gas may be introduced into the combustion chamber through separate inlet openings, or any two or all may be introduced through a single inlet or a plurality of similar inlets. Thus, for example, the ore and carbonaceous material may be introduced as a mixture, and the combustion supporting gas may be introduced separately or used for forcing the mixture into the combustion zone. Likewise, the combustion supporting gas may be used for forcing either the carbonaceous material or the ore into the combustion zone.

The ore is preferably employed in a finely divided condition to promote rapid reduction. Any suitable carbonaceous material such, for example, as powdered coal or fuel oil may be employed.

The process of the invention may be so controlled that the ore in passing through the reducing flame is substantially completely reduced, or only partial reduction may be accomplished during the course of the passage through the flame, and reduction may be completed on the hearth of the furnace chamber. The method of the invention may be carried out in conjunction with any other suitable type of metallurgical process. The invention will be better understood from a consideration of the following description in conjunction with the accompanying drawings in which Fig. 1 is a sectional elevation of a metallurgical furnace which may be employed in carrying out the method of the invention; and Fig. 2 is a sectional plan taken substantially along line A—B of Fig. 1.

The furnace shown in the drawings comprises a horizontal smelting chamber 6 provided with a hearth 7 and a roof 8 and having a vertical combustion-arc chamber 2 and a horizontal combustion-arc chamber 10 communicating with the interior thereof.

The vertical combustion-arc chamber is provided with a substantially centrally disposed vertically extending electrode 1 entering the chamber through a suitable opening in its roof. The electrode is mounted for vertical adjustment and connected to a suitable supply of electric current (not shown). An electrode 5 in the bottom of the hearth 7 of the horizontal smelting chamber provides a terminal for an arc extending downwardly from the electrode 1 in the combustion-arc chamber 2.

The horizontal combustion-arc chamber 10 is provided with a substantially centrally disposed electrode 11 entering the chamber through a suitable opening in its end wall and connected to a suitable source of supply of electric current (not shown). The electrode 5 also provides a terminal for an arc extending inwardly from the electrode 11 in the horizontal combustion-arc chamber 10.

The vertical combustion-arc chamber 2 is provided at its upper end with means for introducing solid materials such, for example, as powdered coal, ore and fluxing materials, comprising a conduit 12 extending through an opening in the side wall 3 of the chamber and communicating with a screw conveyor 15.

The horizontal combustion-arc chamber 10 is provided with a similar charging conduit and screw conveyor adjacent its outer end.

A gas conduit 14 connected to a suitable source of supply of gas (not shown) communicates with the interior of the charging conduit 12 at its point of connection with the trough of the screw conveyor 15.

A plurality of gas conduits or inlets 13, 16, 17 and 18 communicates with the interior of the vertical combustion-arc chambers at points adjacent the electrode 1. The gas conduits are preferably so arranged as to give tangential motion to the gas entering the chamber. The horizontal combustion-arc chamber is provided with similar gas conduits or inlets indicated by the numerals 19, 20 and 21.

A conduit 22 entering the upper portion of the vertical combustion-arc chamber provides additional means for introducing solid materials such as powdered coal, ore and fluxing materials.

The horizontal smelting chamber is provided with doors 8a, 8b and 8c in its side walls which permit access to the interior of the chamber and which provide for the admission of air to burn combustible gases within the chamber. Gas exits are provided at 4 in the vertical combustion-arc chamber and at 9 at one end of the horizontal smelting chamber.

A tapping spout 7a is provided for removing molten material from the interior of the horizontal smelting chamber.

In the operation of the furnace shown in the drawings, the combustion-arc chambers may be operated separately or in conjunction with one another. That is, either combustion-arc chamber may be employed alone or both may be employed at the same time.

In reducing iron oxide ore, the ore in finely divided condition and mixed with suitable fluxing materials and an amount of powdered coal in excess of that required to reduce the ore may be introduced into the vertical combustion-arc chamber by means of the screw conveyor 15 and the charging conduit 12. Air or other oxidizing gas may be introduced through the conduit 14 for the purpose of aiding in the introduction of the solid materials and/or for the purpose of burning a portion of the coal.

Additional air or other combustion supporting gas may be admitted through the inlets 13, 16, 17 and 18 provided for that purpose.

The combustion supporting gas, ore, powdered coal and fluxing material are intimately mixed in the combustion-arc chamber and the mixture in passing downwardly surrounds the arc extending between the vertical electrode 1 and the bottom electrode 5. The combustion supporting gas and powdered coal are provided in such proportions as to insure the production of a strongly reducing flame. A strongly reducing flame is developed as a result of partial oxidation of the carbon by the oxygen of the combustion supporting gas, and the ore in passing downwardly therethrough is reduced.

The metal and slag resulting from the reduction of the iron oxide and fluxing and melting of the gangue materials are collected upon the hearth of the horizontal smelting chamber. Slag and metal layers on the hearth of the horizontal smelting chambers are indicated at 1a and 5a, respectively.

The above procedure may be modified in various ways. For example, a strongly reducing flame surrounding the arc may be first established by admitting, in suitable relative amounts, powdered coal through the charging inlet 12 and air through any or all of the inlet openings provided for that purpose. Ore, preferably in finely divided form, may then be introduced through the charging conduit 22 and permitted to pass downwardly through the reducing flame. The ore, in passing through the flame will be reduced, and the resulting metal and slag will collect on the hearth of the horizontal smelting chamber.

The operation may be so controlled that all of the ore introduced will be reduced in passing through the reducing flame, or the control may be such that only partial reduction is effected while the ore is passing through the reducing flame and reduction is completed on the hearth of the horizontal smelting chamber. Air may be admitted through the doors in the side walls of the horizontal smelting chamber to burn excess carbonaceous material within the chamber.

In carrying out the method of the invention either direct current, or alternating single phase or polyphase current may be employed.

The invention provides a simple and efficient method for reducing ores. The intense heat and strongly reducing nature of the combustion-arc flame result in rapid reduction of the ore. The operation is extremely simple and easily controllable.

What I claim is:

1. The method of operating a metallurgical furnace which comprises passing a mixture of air and carbonaceous material into the furnace chamber along an electric arc to form a combined electric arc and combustion flame, the relative proportions of air and carbonaceous material being such that a reducing flame is produced, and charging finely divided ore into the furnace chamber through the resulting flame.

2. The method of operating a metallurgical furnace which comprises passing a mixture of air and powdered coal into the furnace chamber along an electric arc to form a combined electric arc and combustion flame, the relative proportions of powdered coal and air being such that a reducing flame is produced, and charging finely divided ore into the furnace chamber through the resulting flame.

3. The method of operating a metallurgical furnace which comprises passing a mixture of air and carbonaceous material into the furnace chamber along an electric arc to form a combined electric arc and combustion flame, the relative proportions of air and carbonaceous material being such that a reducing flame is produced, and charging finely divided iron ore into the furnace chamber through the resulting flame.

4. The method of operating a metallurgical furnace which comprises passing a mixture of air and powdered coal into the furnace chamber along an electric arc to form a combined electric arc and combustion flame, the relative proportions of air and powdered coal being such that a reducing flame is produced, and charging finely divided iron ore into the furnace chamber through the resulting flame.

In witness whereof, I have hereunto subscribed my name this 2nd day of July, 1926.

ALBERT E. GREENE.